(12) United States Patent
Foster

(10) Patent No.: US 8,825,242 B2
(45) Date of Patent: Sep. 2, 2014

(54) VEHICLE SYSTEM, AND METHOD

(75) Inventor: Darren Leigh Foster, Gouda (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 1118 days.

(21) Appl. No.: 12/520,517

(22) PCT Filed: Dec. 21, 2007

(86) PCT No.: PCT/NL2007/050680
§ 371 (c)(1),
(2), (4) Date: Jun. 3, 2010

(87) PCT Pub. No.: WO2008/079002
PCT Pub. Date: Jul. 3, 2008

(65) Prior Publication Data
US 2010/0305794 A1 Dec. 2, 2010

(30) Foreign Application Priority Data
Dec. 22, 2006 (EP) ..................... 06077313

(51) Int. Cl.
G06F 19/00 (2011.01)
B60L 11/00 (2006.01)
B60L 9/00 (2006.01)
G06F 17/00 (2006.01)

(52) U.S. Cl.
USPC ............... 701/22; 701/49; 701/468; 903/903; 903/904; 903/930

(58) Field of Classification Search
None
See application file for complete search history.

(56) References Cited

U.S. PATENT DOCUMENTS

| 3,698,182 | A | * | 10/1972 | Knoos | 60/522 |
| 4,759,190 | A | * | 7/1988 | Trachtenberg et al. | 62/3.62 |
| 5,548,283 | A | * | 8/1996 | Martin | 340/870.01 |
| 5,660,310 | A | * | 8/1997 | LeGrow | 224/275 |
| 5,671,141 | A | * | 9/1997 | Smith et al. | 701/33.6 |
| 5,845,221 | A | * | 12/1998 | Hosokawa et al. | 701/36 |
| 5,898,282 | A | * | 4/1999 | Drozdz et al. | 318/139 |
| 5,910,715 | A | * | 6/1999 | Kim et al. | 318/400.01 |
| 5,939,794 | A | * | 8/1999 | Sakai et al. | 290/40 A |
| 5,939,848 | A | * | 8/1999 | Yano et al. | 318/139 |

(Continued)

FOREIGN PATENT DOCUMENTS

| CA | 2 457 216 A1 | 8/2004 |
| DE | 41 23 843 A1 | 1/1993 |

(Continued)

OTHER PUBLICATIONS

Yamaguchi et al., "Dual System-Newly Developed Hybrid System," *International Electric Vehicle Symposium*, 1: 603-610 (1996).

(Continued)

*Primary Examiner* — Calvin Cheung
*Assistant Examiner* — Krishnan Ramesh
(74) *Attorney, Agent, or Firm* — Leydig, Voit & Mayer, Ltd.

(57) ABSTRACT

Vehicle system, comprising: —a hybrid powertrain (E, EMG, B) to drive the vehicle system and configured to generate electric energy; and —at least one electrically operable refrigerator unit (R) configured to cool at least one storage compartment of the system; wherein the refrigerator unit (R) is powered by electric energy generated by the hybrid powertrain.

10 Claims, 8 Drawing Sheets

(56) References Cited

U.S. PATENT DOCUMENTS

| | | | |
|---|---|---|---|
| 6,038,500 A * | 3/2000 | Weiss | 701/22 |
| 6,073,456 A * | 6/2000 | Kawai et al. | 62/133 |
| 6,230,496 B1 * | 5/2001 | Hofmann et al. | 60/706 |
| 6,314,347 B1 * | 11/2001 | Kuroda et al. | 701/22 |
| 6,321,143 B1 * | 11/2001 | Phillips et al. | 701/22 |
| 6,427,107 B1 * | 7/2002 | Chiu et al. | 701/50 |
| 6,484,830 B1 * | 11/2002 | Gruenwald et al. | 180/65.245 |
| 6,543,250 B1 * | 4/2003 | Mills et al. | 62/428 |
| 6,696,815 B1 * | 2/2004 | Kikuchi | 320/104 |
| 6,718,214 B1 * | 4/2004 | Schoettle et al. | 700/28 |
| 6,986,398 B2 * | 1/2006 | Obayashi | 180/65.28 |
| 7,279,801 B2 * | 10/2007 | Kagoshima | 290/40 C |
| 7,426,427 B2 * | 9/2008 | Palandre et al. | 701/22 |
| 7,550,861 B2 * | 6/2009 | Oyobe et al. | 290/40 C |
| 8,295,950 B1 * | 10/2012 | Wordsworth et al. | 700/22 |
| 2003/0098187 A1 * | 5/2003 | Phillips et al. | 180/65.3 |
| 2004/0124703 A1 * | 7/2004 | Tani et al. | 307/10.1 |
| 2004/0168449 A1 * | 9/2004 | Homan et al. | 62/134 |
| 2004/0232769 A1 * | 11/2004 | Pickering | 307/10.1 |
| 2005/0001606 A1 * | 1/2005 | Kagoshima | 323/371 |
| 2005/0274553 A1 * | 12/2005 | Salman et al. | 180/65.2 |
| 2006/0021366 A1 * | 2/2006 | Plummer | 62/236 |
| 2006/0137374 A1 * | 6/2006 | Chen et al. | 62/239 |
| 2006/0142915 A1 * | 6/2006 | Isono et al. | 701/36 |
| 2007/0219430 A1 * | 9/2007 | Moore | 600/300 |
| 2009/0319110 A1 * | 12/2009 | Tani et al. | 701/22 |
| 2010/0268407 A1 * | 10/2010 | Yanagisawa | 701/22 |
| 2010/0280698 A1 * | 11/2010 | Ichikawa | 701/22 |
| 2010/0305794 A1 * | 12/2010 | Foster | 701/22 |
| 2011/0054724 A1 * | 3/2011 | Er et al. | 701/22 |
| 2012/0158232 A1 * | 6/2012 | Banerjee et al. | 701/22 |

FOREIGN PATENT DOCUMENTS

| | | | | |
|---|---|---|---|---|
| DE | 202 07 534 U1 | 10/2002 | | |
| EP | 1 256 476 A2 | 11/2002 | | |
| EP | 1 790 921 A1 | 5/2007 | | |
| EP | 1946985 A1 * | 7/2008 | | B60W 20/00 |
| JP | 2003259549 A * | 9/2003 | | H02J 3/00 |
| JP | 2006037780 A * | 7/2004 | | F02D 29/02 |
| WO | WO 2005/007444 A1 | 1/2005 | | |

OTHER PUBLICATIONS

International Search Report for PCT/NL2007/050680 dated Apr. 18, 2008.

* cited by examiner

VEHICLE SYSTEM, AND METHOD

FIELD OF THE INVENTION

Background

The present invention provides a novel vehicle system.

It is known to mount refrigeration systems for trailers for transport on the trailer itself, the refrigeration systems often consisting of a vapour-compression system. These systems are usually driven by an independent 3-phase electrical supply, or by an engine driven compressor, particularly by one of the following three methods (1-3):

1) the application of a separate 3-phase generator connected to the existing truck powertrain, e.g. engine drive pulley; an external connection to the electricity grid is possible for cooling at night; generator has powers roughly of 15-20 kVA for 10-15 kW cooling power;

2) application of a compressor driven directly from the combustion engine, possibly with extra electrical connection for night cooling; and 3) application of an autonomous generator set, comprising of an engine and 3-phase generator.

These systems are relatively heavy (refrigeration unit 300 kg, generator 65 kg), expensive (for example € 5000), bulky, and lack control to optimise the total truck efficiency (for example: a separate diesel unit to generate refrigerator power consumes roughly 3 l/h). Also, the known systems can emit relatively high levels of greenhouse gasses and other contaminants. Besides, DE 202 07 534 U1 discloses a vehicle having a storage compartment with a refrigerating system. The refrigerating system can be driven by an electromotor, which is powered by a generator that is coupled to a hydraulic motor, which hydraulic motor is coupled to a hydraulic pump via a hydraulic circuit, wherein the hydraulic pump can be driven by a combustion engine. In this case, the vehicle also has a diesel engine to drive the refrigerating system.

DE41 23 843 A1 discloses a vehicle having a chilled container, wherein a cooling unit of the container is driven either by an electric motor or a hydrostatic transmission coupled to the truck engine.

CA 2 457 216 A1 discloses a tractor trailer having a tractor unit and a trailer unit and wherein the tractor unit includes an internal combustion engine. The trailer has an electrical drive arranged to drive at least some of the wheels on the axles of the trailer. The arrangement provides extra power for situations where it is required and can, in the case of electric drive motors mounted directly on the wheel, provide for better braking. According to CA'216, a battery is used to provide the electric power.

Moreover, US2004/168449A1 and U.S. Pat. No. 6,073, 456 relate to air conditioning of vehicle passenger compartments.

SUMMARY OF THE INVENTION

The present invention aims to alleviate at least some of the above-mentioned problems. Particularly, the invention aims to provide an cost effective and energy efficient vehicle system that can provide cooling of at least one storage compartment in a reliable manner.

According to an embodiment of the invention, this is achieved by a vehicle system, characterised in that the system comprises:

a hybrid powertrain to drive the vehicle system and configured to generate electric energy; and at least one electrically operable refrigerator unit configured to cool at least one storage compartment of the system;

wherein the refrigerator unit is powered by electric energy generated by the hybrid powertrain.

Particularly, the refrigerator unit is only electrically powerable.

In this way, there is provided a relatively inexpensive, compact and economical vehicle system, including refrigerator functionality, wherein application of separate, relatively heavy and bulky power generators can be avoided.

Also, according to an embodiment there is provided a method to distribute electric power in a hybrid vehicle system, utilizing a system according to the invention. For example, the method can comprise scheduling vehicle functions based on priorities assigned to those functions, to distribute at least part of available electric power, generated by a hybrid drivetrain, to at least one electrically operable refrigerator unit to cool at least one storage compartment.

Besides, according to an embodiment, there is provided a set of digital machine readable instructions, particularly software code, configured to cause a machine to carry out a method according to the invention when executed by the machine. Also, for example, according to an embodiment of the invention there can be provided a data carrier carrying these digital machine readable instructions. Preferably, at least one refrigerating unit control module is embedded in the machine readable instructions. For example, the machine readable instructions can be implemented in a suitable controller. In a preferred embodiment, the controller is a hardwarecontroller, or is an ECU (electronic controller unit).

In a further embodiment, control of the refrigerator functions can be embedded in/be carried out by a controller configured to control electric power generating and/or consuming components of a hybrid vehicle.

Preferably, the controller comprises a plurality of control modules that are configured to control the components to carry out a plurality of respective electric power generating and consuming functions, for example:

a Charging function to generate electrical energy by driving an electric power generator of the hybrid vehicle using an engine of the vehicle;

a Boost function to increase torque using an electromotor;

a Regenerative braking function, which recovers vehicle kinetic energy by driving an electric power generator without using the engine; and an eDrive function wherein the electromotor uses electric energy to provide torque, particularly without support from the engine;

wherein each control module is associated with one or more respective input variables, For example, the controller can be configured such that the control modules are associated with different priorities with respect to each other, wherein each of the control modules is configured to indicate a demand for execution of the respective function depending on the one or more respective input variables, wherein, in the case that more than one module indicates a demand for its function's execution, the controller is configured to allow the control module to execute its function that has the highest priority of those control modules to indicate the demand for their function's execution.

Preferably, the controller is configured such that different control modules can indicate demand for execution of their respective function at the same time, independently from each other.

Also, according to an advantageous aspect, there is provided a vehicle system, comprising: a powertrain to drive the vehicle system and configured to generate electric energy, and at least one electrically operable refrigerator unit configured to cool at least one storage compartment of the system, wherein the refrigerator unit is powered by electric energy generated by the powertrain, wherein the system is configured to estimate or determine future driving conditions that will require above-average electric power consumption in the powertrain during operation, wherein the system is configured to activate the refrigerator unit to provide extra cooling of the compartment before those driving conditions are experienced. For example, according to a further embodiment, the control system can be configured to utilize Global Positioning System (GPS) data to predict the future driving conditions.

BRIEF DESCRIPTION OF THE DRAWINGS

Further advantageous embodiments are described in the dependent claims. The invention will be further elucidated by means of exemplary embodiments with reference to the accompanying drawings in which:

Equal or corresponding features are denoted by equal or corresponding reference signs in the present application.

DETAILED DESCRIPTION OF THE DRAWINGS

Figure 1:
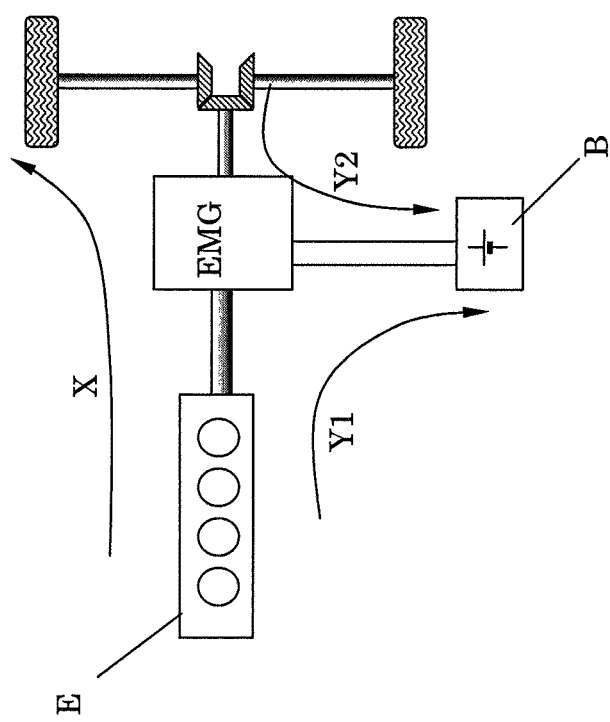
FIG. 1 schematically depicts part of a hybrid vehicle.

FIG. 1 schematically depicts part of a hybrid vehicle. The configuration of hybrid vehicles as such is known to the skilled person and will therefore only be explained in general. The vehicle comprises a hybrid powertrain (drivetrain) comprising an engine E and an electromotor EMG, that can be coupled to vehicle wheels to provide torque to the wheels independent of each other or at the same time. An arrow X indicates a flow of torque energy. Also, a battery (accumulator) B is provided to provide electric energy. Charging of the battery can be achieved in various ways. For example, the powertrain can be in a Charge state, wherein the electromotor EMG functions as an electric generator and is driven by the engine to charge the accumulator/battery B (a resulting energy path is indicated by an arrow Y1 in FIG. 1). For example, the electromotor EMG (or powertrain) can be provided with an inverter to convert direct current into alternating current and vice-versa. Besides, the vehicle can be configured to provide one or more Regenerative states to generate electric power for charging the battery B. Usually, such regenerative states are available during a vehicle braking or vehicle deceleration process, for example in the case that the electromotor/generator EMG is driven by the wheels (a resulting energy path is indicated by an arrow Y2 in FIG. 1). One hybrid vehicle can comprise several energy regeneration systems, for example a regenerator using the electromotor EMG to generate electric power, an electromagnetic or hydraulic retarder, and/or a conventional friction brake that is being hydraulically or pneumatically driven. Besides, the hybrid powertrain can be of a serial hybrid type, a parallel hybrid type or a combination thereof. Preferably, the powertrain comprises a single electromotor EMG that also functions as electric power generator, as in the FIG. 1 embodiment. Alternatively, an electromotor and separate electric generator can be included in the powertrain. Also, the engine E can be an internal combustion engine, for example to combust gasoline, diesel, hydrogen and/or other fuels, or other types of engines. The skilled person will appreciate that the hybrid vehicle generally comprises various other components, for example a transmission, one or more clutches to engage/disengage the engine E and electromotor EMG, converter, as well as sensors S to determine status of various components, for example to determine a battery state of charge (SOC) of the battery, to determine amounts of power provided or requested by the powertrain, to determine operator (driver) demands, and for providing information regarding other parameters, for example thermal variables relating to vehicle cabin temperature and/or exhaust catalyst system.

In an embodiment, the hybrid vehicle can be in various hybrid power states, relating to generation and consumption (use) of the electric power, for example:

a Charging state, wherein electrical energy is being generated by driving the electric power generator EMG using the engine;

a Boost state to increase engine E torque using the electromotor EMG;

a Regeneration state to generate electrical energy by driving an electric power generator (for example the electromotor EMG) without using the engine E;

an eDrive state wherein the torque is generated entirely by the electromotor E and not by the engine E.

Other hybrid power states can be available as well, for example a standby state wherein the powertrain is on standby (for example, when the vehicle stands still).

Figure 2:
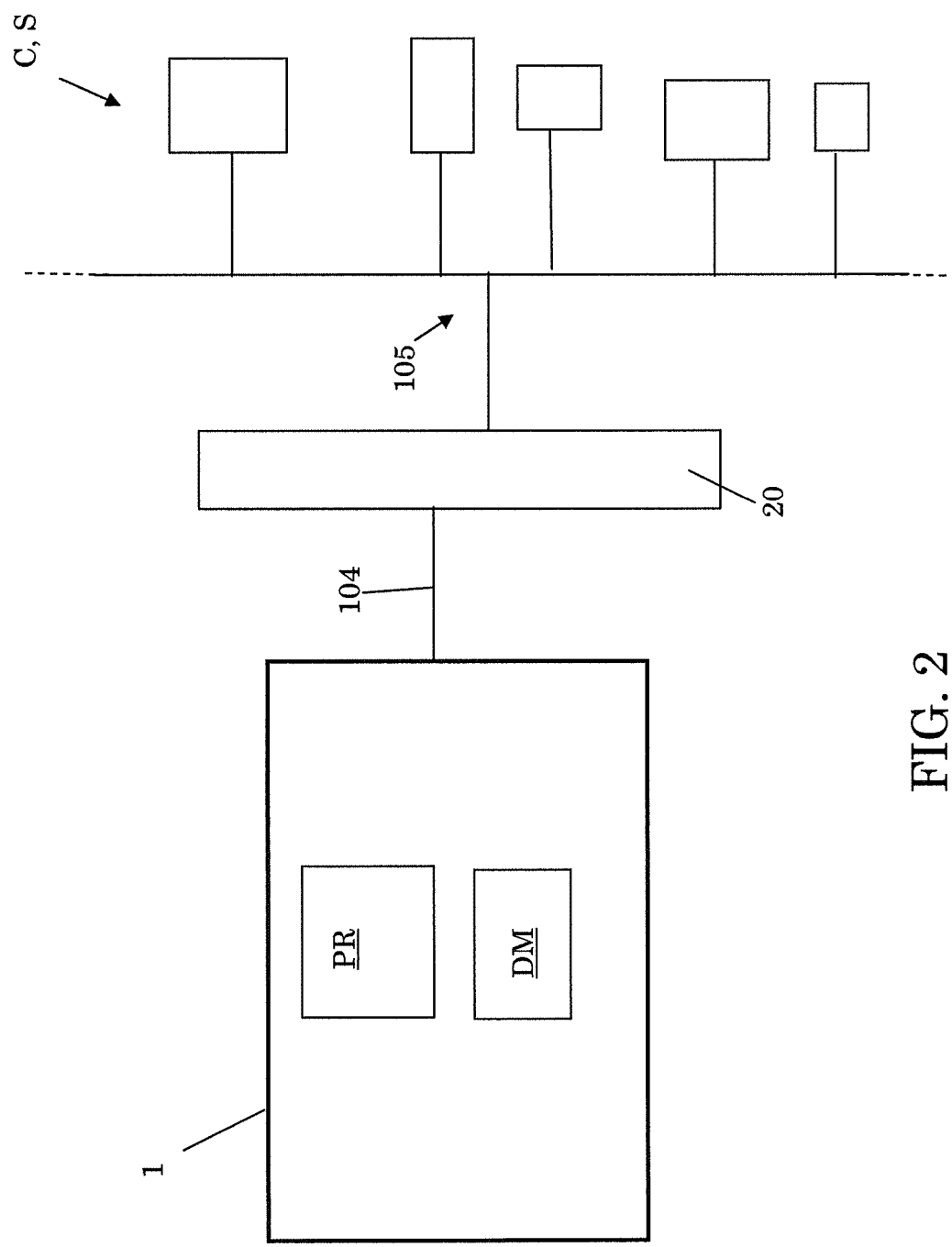
FIG. 2 schematically depicts an embodiment of a control system.

FIG. 2 schematically depicts a non-limiting embodiment of a control system comprising a controller 1, configured to control various electric energy consuming and/or generating components C (i.e. accumulator related components) of a hybrid vehicle. As follows from the above, these components can include: one or more electromotors EMG, one or more electric power generator systems—for example including the engine M to drive an electric power generator EMG—, one or more energy regenerators (see above), one or more battery chargers to charge at least one battery B, and/or other components.

The controller 1 is at least configured to handle power control (i.e. distribution of available electric power or electrical energy), based on certain controller input variables regarding the availability of electric power and the amount(s) of power that is/are needed by certain of the components C.

In the present embodiment, the controller 1 is connectable to and/or comprises the interfacing structure (also called the "hardware interface layer") 20 to provide communication between the controller 1 and respective remote vehicle components C. For example, communication may be single sided (REQ) or handshaked (REQ/ACK), or be of a different format. In the present embodiment, there is provided a first communication system 105 that communicatively interconnects the components C and the interface structure, for example via wired and/or wireless communication means, a vehicle data communication network or in an other manner as will be appreciated by the skilled person. Also, in the present embodiment, there is provided a communication path 104 that communicatively interconnects the interface structure 20 and controller 1, to allow data communication there-between.

Alternatively, the interface 20 can be integral part of the controller 1, or there can be provided a plurality of suitable data interfaces to allow communication between the controller 1 and remote vehicle components C.

Communication between controller 1 and vehicle components C can include transmission of control information from the controller 1 to respective vehicle components, to control (for example activate, deactivate and/or change operation of) those components C. Also, the communication can include transmission of vehicle power status information to the controller 1. The mentioned status information can include various power related variables, for example the variables: a battery state of charge, vehicle drive power, brake regenerator power, retarder regenerator power, and/or other power related variables. These variables can be dependent on driver related actions, driving conditions, driving as such, as will be appreciated by the skilled person. For example, vehicle power status information can be generated by respective vehicle components C, sensors S, a vehicle speed controller (not shown) configured to request that the powertrain provides a certain amount of drive power to attain or maintain a certain vehicle speed, and/or other vehicle parts or systems.

For example, the interfacing structure 20 is configured to receive power status information (for example from the respective vehicle parts) and to transmit received status information to the controller 1, particularly in a format that can be read by the controller 1. For example, the interfacing structure 20 is preferably configured to translate vehicle status information into specific input variables to be received by the controller 1.

In an embodiment, the mentioned power status information can include various types of information. For example, in the present embodiment, the vehicle can be configured to generate vehicle power status information, regarding status of components C (the status particularly comprising electric power related information with respect to the component C). For example, one or more of these components C can be configured to generate electric power related status information, for example information including an amount of electric power that is required or requested by the respective component C during operation, depending for example on the state and operation of the vehicle.

Besides, as mentioned above, there can be provided one or more sensors S to determine power status of various components, for example to determine a battery state of charge (SOC) of the battery B. For example, one or more of these sensors S can be part of the respective vehicle components C, or be part of dedicated vehicle control systems (for example a vehicle speed controller). For example, a sensor S can be part or a local component-controller, wherein the local controller can process a sensor signal and transmit a processed sensor signal, or sensor signal related information, to the hybrid controller 1. Each sensor S can also be configured to generate power related status information regarding the parameter(s) measured or assessed by that sensor S.

For example, a battery state of charge sensor S can provide information regarding the battery state or charge, and can preferably generate information including a request for the battery B to be charged in the case the sensor S detects or determines that the battery state of charge has reached a relatively low level, or is expected to reach such low level within a short amount of time.

In a further embodiment, for example, there can be two levels: a first level (for example in a local batterycontroller), wherein a charge controlling function is available which determines if charging is desired and wherein a warning message, for example "load now or else the battery might be damaged" can be generated. A second level can be a safety function, which may be part of the hardware interface layer 20.

Besides, the battery state of charge sensor S can provide information that the battery does not have to be charged in the case the sensor S detects or determines that the battery state of charge has reached a relatively high charging level. Besides, a vehicle speed sensor can be available, for example as part of a vehicle control unit, to provide information regarding the actual vehicle speed.

The controller 1 can be configured in various ways. Preferably, the controller 1 is a provided with machine readable instructions, particularly a set of digital code or control algorithm, configured to cause the controller 1 to carry out a method as will be described below when executed by the controller. The controller 1 can comprise suitable hardware, for example one or more processors PR to execute the instructions, a data memory DM that can be accessed by the one or more processors PR, for example to hold at least part of the instructions and/or instruction-related variables, as will be appreciated by the skilled person.

In a preferred embodiment, the controller 1 comprises a plurality of substantially autonomously operating control modules 11, 12, 13, that are configured to control the components C to carry out a plurality of respective electric power generating and consuming/using (virtual) functions, for example:

a Charging function to generate electrical energy by driving an electric power generator of the hybrid vehicle using an engine of the vehicle;

a Boost function to increase torque using an electromotor;

a Regeneration function to generate electrical energy by driving an electric power generator without using the engine; and an eDrive function wherein the electromotor uses electric energy to provide torque without support from the engine.

In a preferred embodiment, the components C can be controlled by the modules 11, 12, 13 indirectly via the interface layer 20, wherein the control modules 11, 12, 13 can control the interface layer 20 (or respective interface layer parts being associated with the respective functions), and the respective interface layer parts can control the components C, based on instructions received by the control modules 11, 12, 13. Thus, the interface layer 20 can control the components C, under management of the control modules 11, 12, 13.

Figure 3:
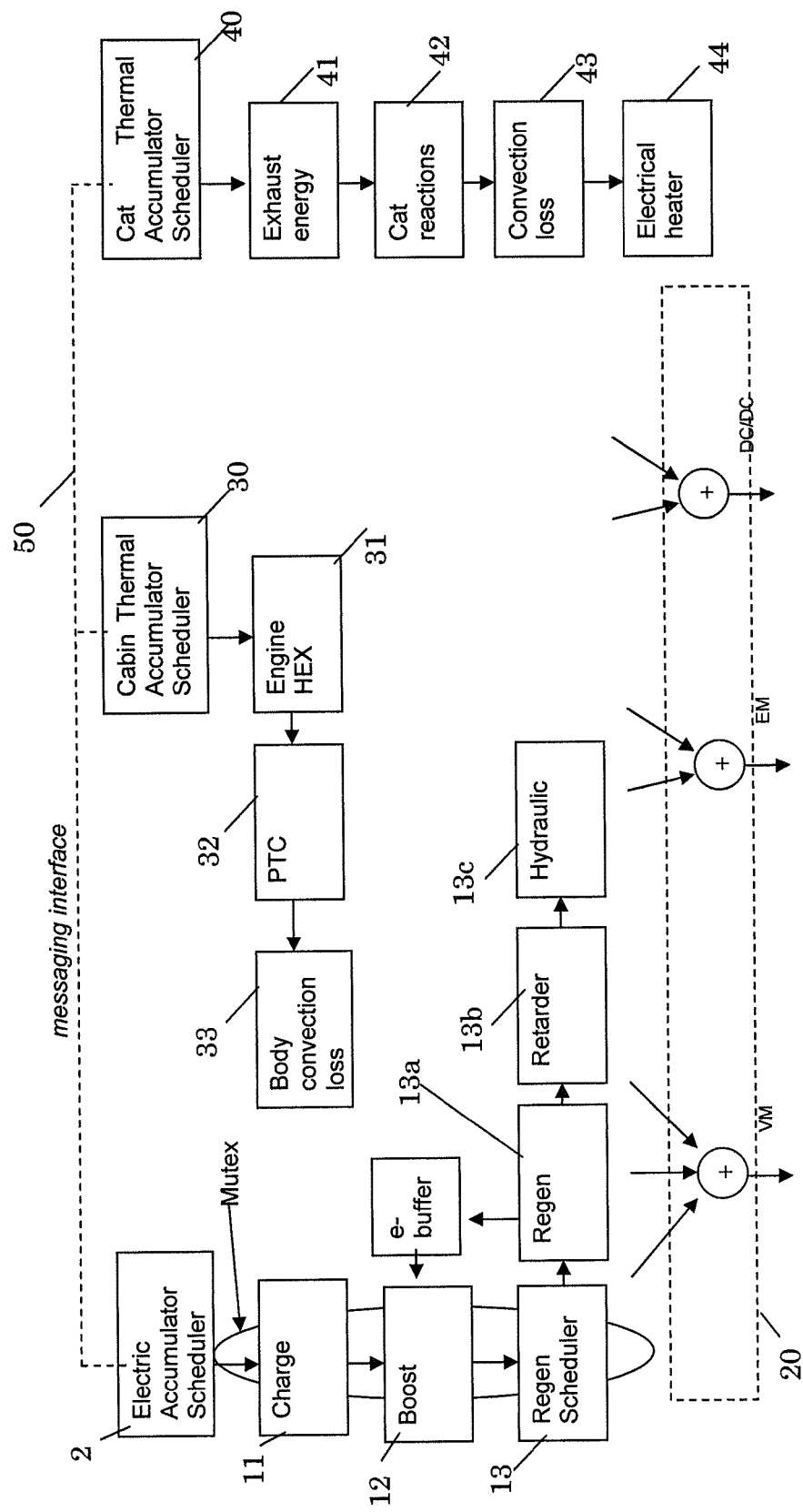
FIG. 3 is a flow chart of an embodiment of a control method.

In the present embodiment, these control modules 11, 12, 13 are integrated or implemented in the controller 1, i.e., in the above-mentioned machine readable instructions. FIG. 3 shows a flow chart of an embodiment of a method that is carried out by the controller, the flow chart indicating the control modules 11, 12, 13.

As a non limiting example, the present embodiment comprises a first control module 11 to control a Charge function, a second control module to control a Boost function, and a third control module 13 to control electric power Regeneration. Other control modules can be added to the controller 1 is a simple manner, for example an eDrive control module (not shown) relating to the eDrive function.

Each control module 11, 12, 13 is preferably associated with one or more respective input variables (the input variables which can be received by the controller 1 via the interfacing structure, as has been described above). For example, the first control module 11 can be associated with a battery-state-of-charge variable, the second control module 12 can be associated with a drive-power variable and the third control module can be associated with one or more regenerator-power variables. Also, the control modules 11, 12, 13 are associated with different priorities with respect to each other. For example, these priorities and the mentioned variables can be stored in the memory DM, to be assessed (read and/or written) by a processing part PR of the controller 1. Each of the control modules 11, 12, 13 is preferably configured to request execution of the respective function depending on the one or more respective input variables (i.e. to provide information to indicate that the function is in demand, depending on the input variables).

For example, in an embodiment, a control module 11, 12, 13 can be configured to automatically request execution of the respective function depending on the one or more respective input variables. In an alternative and preferred embodiment, for example, the control module 11, 12, 13 can be asked (for example by a scheduler 2 of the controller) periodically, whether the respective function is to be executed, wherein as a result the control module 11, 12, 13 can check its input parameters and, depending on those parameters, can confirm or deny (in a reply) that the function is to be executed, via a suitable indication.

In the case that only one of the control modules 11, 12, 13 requests its function's execution, the controller 1 can allow that control module to execute its function. However, in a further embodiment, this may depend on the use of an energy budget, as will be explained below (for example, optionally, the controller 1 can check whether the control module has used up a respective energy budget, and can deny the module to execute the function in case the respective energy budget has been used up).

The controller 1 is configured such that in the case that more than one module 11, 12, 13 requests its function's execution, the controller 1 is configured to allow the control module 11, 12, 13 to execute its function that has the highest priority of those control modules requesting their function's execution. For example, the controller 1 can be configured such that different controller modules 11, 12, 13 can request execution of their respective function at the same time, independently from each other, wherein the controller 1 is configured to allow only one of the control modules 11, 12, 13 to execute its function at a time (and optionally, based on the usage of an energy budget of the control module). The term "at the same time" is to be interpreted broadly, and can mean, for example, "instantaneously", and/or "within a single control iteration" of the controller 1 (for example: in each iteration of a plurality of control iterations, the controller 1 carries out a certain control process to receive execution requests form all control modules), as will be appreciated by the skilled person.

Each of the control modules 11, 12, 13 can be configured to execute its function (particularly by transmitting suitable control information to its respective vehicle component(s) via respective interface layer parts, i.e. by transmitting suitable control information to the interface layer 20 in order to have the interface layer 20 controlling the component(s) C to execute the function), depending on whether such execution is being allowed by the controller 1. As an example, in the present embodiment, in the case that first module 11 is being allowed to execute its function, that module with transmit information via the interface 20 to bring the vehicle in the charging state, wherein respective vehicle components E, EMG charge the battery B. In the case that second module 12 is being allowed to execute its function, that module 12 with transmit information via the interface 20 to bring the vehicle in the Boost state, wherein the electromotor EMG provides additional torque to the powertrain. In the case that third module 13 is being allowed to execute its function, that module 13 with transmit information via the interface 20 to bring the vehicle in the regeneration state, wherein respective vehicle components M, EMG regenerate electric power. In the case that an eDrive module is being allowed to execute its function, that module with transmit information via the interface 20 to bring the vehicle in the eDrive state, wherein only the electromotor EMG is active (not the engine E) provide torque to the vehicle.

Preferably, the controller 1 comprises a main scheduler 2, preferably being a mutex scheduler 2, that is configured to allow only one of the control modules 11, 12, 13 to execute its respective function at a time. In the present embodiment, the mutex scheduler 2 can simple be embedded in/be part of the mentioned machine readable instructions of the controller 1.

The mutex scheduler 2 can operate in various ways. For example, in an embodiment, the mutex scheduler 2 can be configured to select from a number of control modules 11, 12, 13 demanding that their function is carried out, only the control module 11, 12, 13 having the highest priority to have its function carried out. Also, in an embodiment, the mutex scheduler 2 can be configured to disallow a one control module to have its function carried out, in the case that an other of the control modules, having a higher priority than the former module, is selected to have its function carried out. For example, according to an embodiment, the main scheduler 2 can receive different execution (activation) requests from the different control modules 11, 12, 13 at the same time, during operation.

In the present embodiment, preferably, the interfacing structure 20 can provide transmission of control information (i.e. translate the control information into/towards the function space) from each of the control modules 11, 12, 13 to respective vehicle components and transmission of power status information from the vehicle component to the control modules 11, 12, 13, the interfacing structure 20 being configured to translate power status information (received via the communication means 105) into the specific input variables to be received by the respective control modules 11, 12, 13. For example, the interface 20 can be configured to send battery-state-of-charge information (particularly after being translated into an input variable) to the Charge module 11 of the controller 1 only, and not to any of the other two control modules 12, 13. Also, for example, the Charge control module 11 can be configured to accept and/or operate only the input variable(s) that is/are associated therewith, for example only the battery-of-charge variable. The interface 20 can be configured to send drive-power information (particularly after being translated into an input variable) to the Boost module 12 only, and not to any of the other two control modules 11, 13. Regenerator information, that is received by the interface 20, can be translated and send to the Regenerator control module 13 only, and not to any of the other two control modules 11, 12. Besides, in an embodiment, one or more of input variables can be transmitted to different control modules, to be accepted thereby. For example, a drive-power variable, associated with an amount of total electric power is needed by the powertrain to drive the vehicle, can be transmitted to both a Boost control module 12 and an e-drive control module (not specifically shown in FIG. 3).

In an embodiment, each control module 11, 12, 13 can be configured to generate a respective activation request in the case that respective one or more input variables indicate that the respective function is in demand. For example, the controller 1 (particularly the mutex scheduler 2 thereof) can be configured to continuously or semi-continuously search for such activation requests, and to keep searching after having encountered such an request.

Besides, in an embodiment, each control module 11, 12, 13) can be configured to generate a respective activation request in the case that respective one or more input variables indicate that the respective function is in demand, wherein the controller 1 (i.e. mutex scheduler 2) can be configured to be triggered by each generation of an activation request to determine, whether or not activation of the requested function is allowed based on presence of activation requests of the other control modules and based on the priorities of the control modules.

In the present embodiment (see FIG. 3), the Regenerating-module 13 includes a plurality of sub-modules relating to respective sub-functions, wherein the sub-modules are preferably prioritised with respect of each other whereas the sub-functions can be run in parallel. For example, a first submodule 13a can be configured to control a first regeneration function that includes driving the electromotor/generator EMG to generate power. A second submodule 13b can control a second regeneration function including operation of a dedicated retarder (not shown) to retard the vehicle and generate electric power. A third submodule 13c can be configured to execute a regenerating function resulting from a mechanical (for example hydraulic or pneumatic) brake system. These submodules 13a, 13b, 13c do not have to be prioritized with respect of each other, and the Regeneration module can be provided with a scheduler to allow shared (simultaneous) execution of the functions of the submodules 13a, 13b, 13c, if requested by these submodules. In a more preferred embodiment, the submodules 13a, 13b, 13c are prioritized with respect to each other, but might operate at the same time, depending for example on power requests and available power. In that case, for example, in case the highest priority submodule 13a is allowed all available power, the remaining submodules 13b, 13c do not gain any power. On the other hand, in that case, when the higher priority submodule 13a does not use up all available power, a lower priority submodule 13b can be provided with a remaining power part etc. Besides, as is shown in FIG. 3, there can be provided an energy buffer 75, buffering energy from a submodule 13a.

For example, the interface 20 can expose further vehicle functionality, with additional schedulers per energy buffer of energy forms other than electric. The different power requests from each scheduler and associated functions can be combined in the interface layer 20 to determine component control signals.

In a further embodiment, the controller 1 is configured to assess and control thermal energy buffers available on the vehicle as well. For example, the vehicle can include various heat sources, for example the engine (Engine HEX 31) and one or more electric heaters (for example a heater or PTC thermistor heating element 32 to heat the driver cabin, a heater 44 to heat part of an exhaust catalyst system). Also, the vehicle can loose heat in various ways, for example heat energy 41 via the exhaust, via heat radiation and convection 33 from a body of the vehicle, convection loss 43 via the exhaust catalyst system, heat loss 42 via catalytic chemical reactions, and/or in a different manner.

In an advantageous embodiment, the controller 1 can also be configured to assign or associate an energy budget to/with each of the functions (i.e., to the control modules 11, 12, 13). For example, the controller 1 is configured to alter an amount of energy that is available to that function in the case that the function has used up at least part of its energy budget. Also, for example, the controller 1 can be configured to allow or deny execution of a function depending on an amount of energy used by that function. For example, the energy budgets of the various functions can be stored in the memory part DM of the controller 1. In a further embodiment, the controller 1 is configured to calculate or estimate each electric energy budget from history (for example from previous driving periods before a present driving period) and/or using expected future values. In a further embodiment, the controller 1 is configured to allocated electric power budgets to the different functions (or control modules 11, 12, 13). Preferably, the controller 1 can be configured such that during operation, when a function (or control module 11, 12, 13) has used up its budgetary value or energy quantum, that function is removed from scope, for example, removed from a run list to a wait list.

For example, the controller 1 can deny a control module 11, 12, 13 to execute its respective function, in the case the control module 11, 12, 13 has used up its energy budget. Also, in that case, for example, the priority of the respective control module 11, 12, 13 can be automatically decreased by the controller 1, or the respective function is simply not carried out anymore. The skilled person will appreciate that this process may take place through a multitude of methods, with either fine or coarse grained quanta. Also, herein, electric power allocation itself may be dependent on a function's budget as such (the budget does not have to be part of a function, but the function can be related to a budget). For example, allocation of available power to a module 11, 12, 13 can be proportional to the amount of budget that has been used, for example in a linear (i.e. half the budget being used by a module 11, 12, 13 means half the power being allocated to that module 11, 12, 13) or non-linear fashion.

Figure 4:
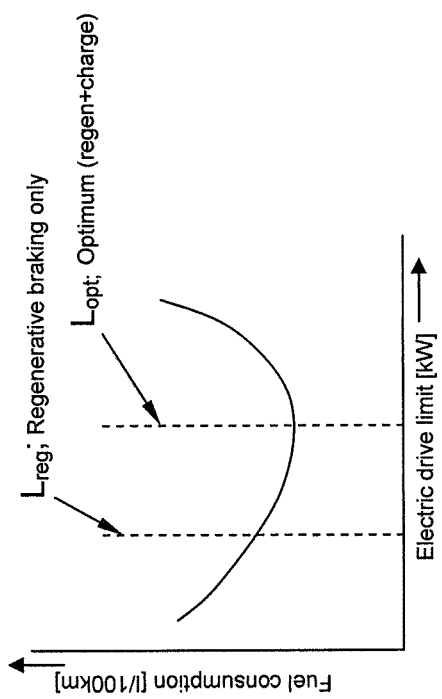
FIG. 4 is a graph of Fuel consumption as function of Electric drive limit.

Therefore, in order to maintain an optimal fuel economy, a balance can be provided between electric power source-functions and electric power source sink-functions, by providing the concept of an energy budget per function. For example, the function (module) e-drive provides a fuel economy benefit up to an energy usage limit value, after which fuel economy drops significantly. The present embodiment also assists the engineer in dealing with this type of highly complex system. FIG. 4 depicts en example of a graph of engine Fuel consumption (1/100 km) as function of Electric drive limit (kW). The electric drive limit is the electric power budget that is available for the vehicle to be in the eDrive state. An optimum electric drive limit is indicated by dashed line $L_{opt}$. In that case, fuel consumption is at a minimum and the Charge function can be used additional to the Regeneration function (in a mutually exclusive manner based on their priorities) to provide energy for the e-drive function. Also, a second, lower, electric drive limit state $L_{reg}$ is indicated, wherein fuel consumption is significantly higher than at the optimum electric drive limit, in which case for example only the Regenerating function can be available. In other words, a driving condition when only Regen is being used can result in $L_{reg}$. In case E-drive has access to two sources via the budgets, the advantage of E-drive can be increased.

Thus, as follows from FIG. 4, to improve vehicle fuel consumption, a charge function can be used additional to a regeneration function to provide energy for the e-drive function. For example, all hybrid power functions can be limited, in a similar manner, with a minimum and maximum power determined to guarantee a minimum path efficiency.

The controller 1 can also be provided with one or more thermal buffer control modules or schedulers 30, 40 for controlling production and loss of heat in an energy efficient manner, for example a cabin thermal accumulator scheduler 30 (relating to heat accumulation) and a catalyst thermal accumulator scheduler 40 (also relating to heat accumulation). To this aim, the controller 1 is preferably configured to adjust priorities of the electric power related control modules 11, 12, 13 based on changing thermal demands. For example, the thermal buffer schedulers 30, 40 can be configured to cooperate with the main scheduler 2 to increase the priority of the Charge module 11, so that the chance that the engine is activated to charge the battery B is increased, in the case that the thermal buffer of the exhaust catalyst system requires supply of heat (i.e., in the case the temperature of the exhaust catalyst system has dropped below some predetermined or preferred minimum value). Similarly, the thermal buffer schedulers 30, 40 can be configured to cooperate with the main scheduler 2 to increase the priority of an eDrive or Boost module, so that the chance that an active engine is deactivated, in the case that the thermal buffer of the exhaust catalyst system requires heat loss (i.e., when the temperature of the exhaust catalyst system is higher that some predetermined or preferred maximum value). Cooperation between the main scheduler 2 and the thermal schedulers 30, 40 can include data communication via suitable communication means, for example via a messaging interface 50 allowing data transmission between the schedulers and/or in a different manner.

During use of the embodiment of FIGS. 1-3, one or more of the control modules 11, 12, 13 can request execution of the respective function depending on the one or more respective input variables. In the case that more than one module 11, 12, 13 requests its function's execution, the control module 11, 12, 13 that has the highest priority of those control modules requesting their function's execution, is allowed to execute that function. Also, preferably, only one of the control modules 11, 12, 13 is allowed to execute its function at a time, by the electric accumulator scheduler 2. Also, interfacing control information is being transmitted from the control modules 11, 12, 13 to respective vehicle components C and power status information to the control modules 11, 12, 13, via the interfacing structure 20 which translates the information into the specific input variables to be received by respective control modules 11, 12, 13.

As follows from the above, during use, in an embodiment, a control module 11, 12, 13 can generate a respective activation request in the case that respective one or more input variables indicate that the respective function is in demand, wherein the activation request is independent of the status of the other control modules. Besides, in an embodiment, an activation request of a control module 11, 12, 13 can trigger the main scheduler 2, wherein the triggered scheduler 2 can determine whether or not activation of the requested function is allowed based on presence of activation requests of the other control modules and based on the different priorities of the control modules. Herein, the method can also include the mutual excusive scheduling of a plurality of accumulator related functions, particularly various regenerating functions relating to respective submodules 13a, 13b, 13c, wherein at least one of these functions includes a plurality of sub-functions, wherein the method preferably includes a parallel scheduling of these sub-functions.

In the case that a control module 11, 12, 13 has become active, it controls the respective components to carry out the respective function. Also, a module 11, 12, 13 can be configured to return to an inactive state automatically, for example in the case that the function is not in demand anymore, for example based on respective information received from certain vehicle component(s) via the interfacing structure 20.

Therefore, during use, the controller 1 treats different electric power as separate entities that are only defined by the state variables of which the function (i.e. the respective control module 11, 12, 13) is dependent (i.e. the function "e-drive" is driven by variable "drive power", and the function "charge" is controlled by variable "battery state of charge". Each function (i.e. the respective control module 11, 12, 13) has been given a priority. Each function (i.e. the control module 11, 12, 13) checks its input variables (as instructed by the scheduler 2), and the function (control module 11, 12, 13) with the highest priority requests execution runs. For example, if the e-drive control module is active and battery state of charge (SOC) is high, and the e-drive control module has a lower priority than the charge control module 11, the function "charge" does not run until SOC drops below a certain limit. Until then, the e-drive control module takes over control. When the SOC drops below a certain critical value, it requests control, and as the charge control module 11 has a higher priority, it pre-empts "e-drive", thereby taking control of the system. In this way, virtual functions are reusable and orthogonal to the greatest possible extent. Priorities of the control modules 11, 12, 13 are not necessarily static, but may be changed in real time, for example by other software elements (such as thermal buffer related controller elements).

For example, as follows from the above, during use, the method preferably includes assessment of thermal energy buffers available on the vehicle, wherein priorities of the control modules 11, 12, 13 are at least partly made dependent of thermal demands relating to those thermal buffers.

During use, for example, a main scheduling part 2, 11, 12, 13 of the controller 1 can represent/relate to the enery buffer "battery", which can represents one branch of the control tree (see FIG. 3). As follows from the above, a multiplicity of energy buffers can be available on board the hybrid vehicle, e.g. thermal buffer of the exhaust aftertreatment system. Preferably, as is explained above, the controller 1 is configured sich that different buffers can interact with one another (e.g. through a model/mapping function). In an embodiment, the described control system can be energy and power centric, so that any vehicle system dealing with energy or power may be controlled with such controller 1, also allowing interaction between the various systems. E.g., the virtual function "e-drive", provided by the controller 1 (via the respective control module) can remove an energy source (exhaust gas) from an exhaust catalyst brick. In such a way, functions to maintain exhaust reduction and oxidisation capability may be either promoted via a priority change (adaptive prioritisation) or by triggering a higher priority function.

In the present system and method, particularly, the control modules 11, 12, 13 (or respective functions) as such are prioritized, and not transitions between said control modules or functions. Thus, a very orthogonal, modular system and method is provided, wherein autonomously operating control modules 11, 12, 13 do not overlap, and their virtual functions therefore also do not overlap in a virtual state space.

The above example is based on the controller 1 including a mutex scheduler 2 for power distribution, i.e. only one virtual function in the function tree may take control at any given time. Another type of power distribution (scheduling algorithm) that can be available is shared power distribution. This can be the case for functions "regenerate" and "hydraulic braking" (see FIG. 3), as any required power request may be shared amongst these two functions. Despite the differences between sharing and mutex, the system is functionally similar. The present embodiment can also be provided with one or more other scheduling methods for scheduling electric power related functions of the hybrid vehicle.

Also, an advantage of the present controller 1 and respective control method is that it can provides hardware independence. In the present embodiment, the layout of the controller 1 can remain the same for different hybrid vehicles (for example of different manufactures, different hybrid vehicle models, different hybrid types), wherein only the interfacing system has to be altered to allow that controller 1 to control the different vehicles.

For example, in an embodiment, output from the virtual function level of the controller (as depicted in FIG. 3) is "power". These abstract signals can be mapped to the physical hardware of the vehicle. By using abstract concepts such as "boost" and "charge", a broad range of vehicles may be controlled by the one high level control system provided by the present embodiment. The outputs can be mapped to a specific hardware configuration by the hardware interface layer (HIL) 20. This layer 20 translates higher level signals to component specific signals. For example, for each type of hybrid vehicle, a dedicated data translating interface (hardware interface layer; HIL) 20 can be provided, to allow the controller 1 to interact with that vehicle. The HIL 20 particularly exposes a standardized interface to the hardware.

Besides, since the layout of the controller 1 is of a modular design, electric power related functions can be added or removed from the controller in a simple manner, to accommodate for operation with vehicles having different (more or less) electric power related functions.

For example, as follows from the above and FIG. 2-3, the present hybrid vehicle controlling embodiment can be configured to expose energy paths through the interface 20. For example, a charge request from the vehicle is received by the interface 20. This request can include a request for vehicle kinetic energy (increase or decrease), and a battery charge request (increase or decrease). The system can be configured to map these requests onto paths, propagating the power requests back along the path engine—vehicle (drive request), and engine—electric machine—battery (charge request). Along the path, component power requests are determined, where necessary summing and clipping to component limits. These power requests are then sent through to the specific powertrain components. As follows from the above, these paths may have shared or mutex semaphores, with priority pre-emption, and self limiting power restrictions from the cascade.

The present embodiment can provide fuel efficiency, for example via the ballancing of energy budgets. The controller is particularly architecture independent. The interface layer 20 can provide standardization of the controller 1, without requiring modification of vehicle hardware that is to be controlled by the controller 1. Due to the modular structure of the controller 1, functionality can be adapted to the vehicle specifications in a simple manner, and to available controller processing capacity. Also, calibration of the controller embodiment can be carried out more accurately and in a straightforward manner, due to a 'locality' of the priorities of the different virtual functions. Besides, by using a standard structure en modular design, effort to generate production-code can be reduced.

Figure 5:
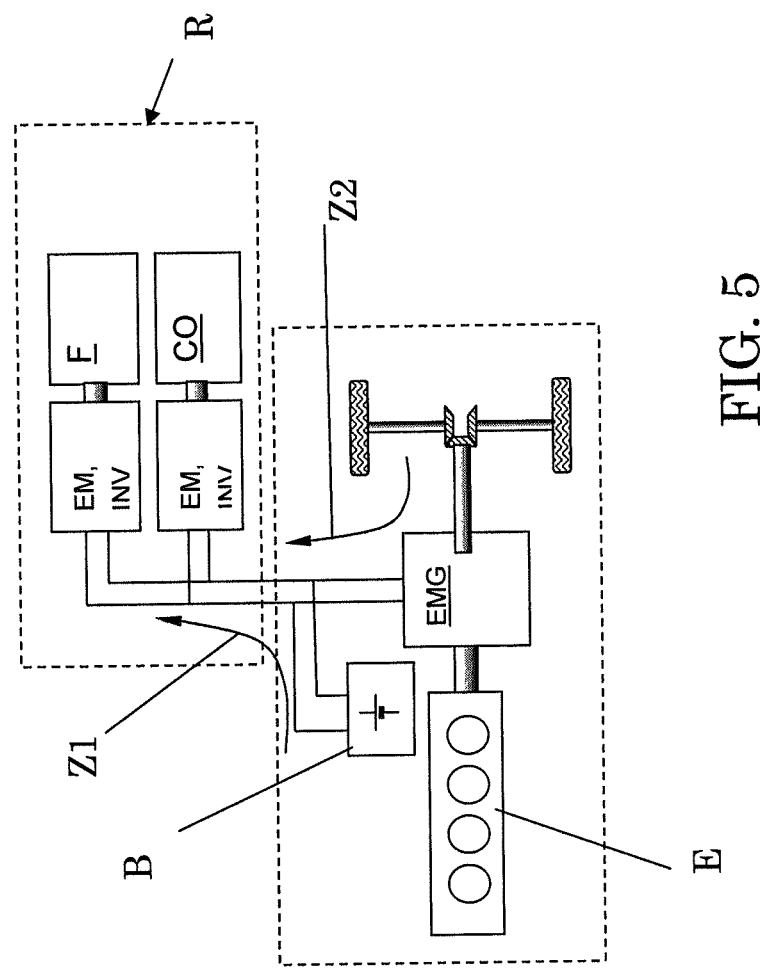
FIG. 5 is similar to FIG. 1 and shows a hybrid vehicle system including a refrigerating unit.

The embodiment of FIG. 5 differs from the embodiment of FIG. 1 in that the vehicle (or vehicle system) is now also provided with at least one refrigerating unit R. This unit is electrically operable and is configured to cool at least one storage compartment of the system, for example a transport storage container, a trailer compartment of a trailer, or a different space that is to be cooled. As an example, the vehicle include a truck for transporting the trailer. Particularly, the storage compartment is different from a driver's cabin, in that the storage compartment can be cooled to relatively low temperatures, for example a temperature of less than 10° C. As an example, the refrigerator unit R can be configured to consume at least 10 kW of powertrain generated energy during its operation. In a further embodiment, the capacity of the refrigerator unit R is such that the unit can cool the storage compartment to temperatures below 0° C., for example for freezing the content (for example food stuff) of that compartment. Also, the refrigerator unit R can be configured to cool the compartment to temperatures in the range of 0-5° C., for example in the case the content of the compartment is to be kept just above 0° C.

Particularly, according to an embodiment, the refrigerator unit R can have a first maximum power consumption capacity (for example at least 10 kW), and the electromotor EMG of the hybrid drivetrain can have a second maximum power consumption capacity (for example 45 kW). In that case, the present invention can allow the hybrid drivetrain to have a maximum power delivery capacity (for example a maximum capacity that can be delivered by the battery B) that is lower than the total of the maximum power consumption capacities of all of the vehicles components (specifically mainly comprising the maximum power consumption capacities of electromotor EMG and refrigerator unit R). Particularly, according to an embodiment, the maximum power consumption capacity of the refrigerator unit R can be more than about 20% of the maximum power delivery capacity of the hybrid powertrain. Also, the maximum power consumption capacity of the hybrid drive electromotor EMG can be more than 80% of the maximum power delivery capacity.

The refrigerator unit R can be of the commonly known compressor-evaporator type, as will be appreciated by the skilled person, and can include one or more electrically powered compressors CO to compress a refrigerant fluid. Preferably, the one or more compressors CO are only powerable by electric energy. Also, the refrigerator unit R can include other components, for example a heat exchanger to remove heat from the refrigerant to an environment, and a fan F to blow air along the heat exchanger. One or more electromotors EM can be provided to drive the compressor(s) CO and optional fan(s) F. Each of these electromotors EM can be a direct current (DC) driven electromotor, however, advantageously, each refrigerator unit electromotor is of the alternating current (AC) driven type. In the latter case, the refrigerator unit R preferably comprises one or more inverters INV, each inerter being configured to invert direct current into alternating current, to drive at least one electromotor EM of the refrigerator unit R. For example, in the FIG. 5 embodiment, the vehicle system comprises a refrigerator unit R having a fan that is driven by a respective electromotor-invertor assembly, and having a compressor CO that is driven by a respective electromotor-invertor assembly.

Also, the embodiment of FIG. 5 comprises a hybrid powertrain E, EMG, B to drive the vehicle system and configured to generate electric energy. The powertrain as such can be configured the same as the embodiment described above regarding FIGS. 1-4.

As follows from FIG. 5, advantageously, the refrigerator unit R can be only be powered by electric energy generated by the hybrid powertrain. In the present embodiment, to this aim, an electric power input of the refrigerator unit R has been coupled to an electric power output of the powertrain, such that the electromotor/inverter EM/INV assemblies of the refrigerating system R can receive direct current from the battery B (indicated by an arrow Z1) and/or the electromotor/generator EMG power regenerator (indicated by an arrow Z2). Besides, electric power provided by other hybrid power train components, for example optional brake power regenerators, can be used to power the refrigerator unit R. Coupling of the refrigerator unit R to a power output of the hybrid power train can be provided in various ways, for example via suitable electric wiring, power busses, in a detachable manner, or in a different way, as will be appreciated by the skilled person.

In a preferred embodiment, there is also provided a controller 1 that is configured to control the at least one refrigerator unit R depending on the availability of hybrid powertrain generated electric energy. For example the controller 1 can be configured to control the hybrid powertrain as well, for example to schedule or distribute electric power during operation. In a further embodiment, an above-described hybrid system controller 1, that comprises a plurality of control modules (11, 12, 13) configured to control the components (C) to carry out a plurality of respective electric power generating and consuming functions in a substantially orthogonal manner, can also be configured to control operation of the refrigerator unit R, or at least to allow or schedule certain amounts of electric power to be fed to the refrigerator unit R. For example, according to an embodiment, a controller as schematically shown in FIGS. 2-3 can also configured to schedule operation of the at least one refrigerator unit R. Herein, power can be co-ordinated by powertrain and refrigeration controllers, which may or may not be implemented in the same physical controller, as will be appreciated by the skilled person.

Preferably, in the control system, next to the hybrid control tree, one or more extra functions/modules 162, 165 can be added that controls the electrical power allocation to the refrigerator unit R. Each additional refrigerator control module 162, 165 can be attached a priority, and can optionally be connected to a thermal buffer representing the trailer. For example, an emergency refrigeration function 162 may be added with a relatively high priority, which gives priority to the refrigeration system R under emergency conditions (e.g. under conditions that the loading may spoil). An example thereof will be explained concerning the embodiment of FIG. 6.

Figure 6:
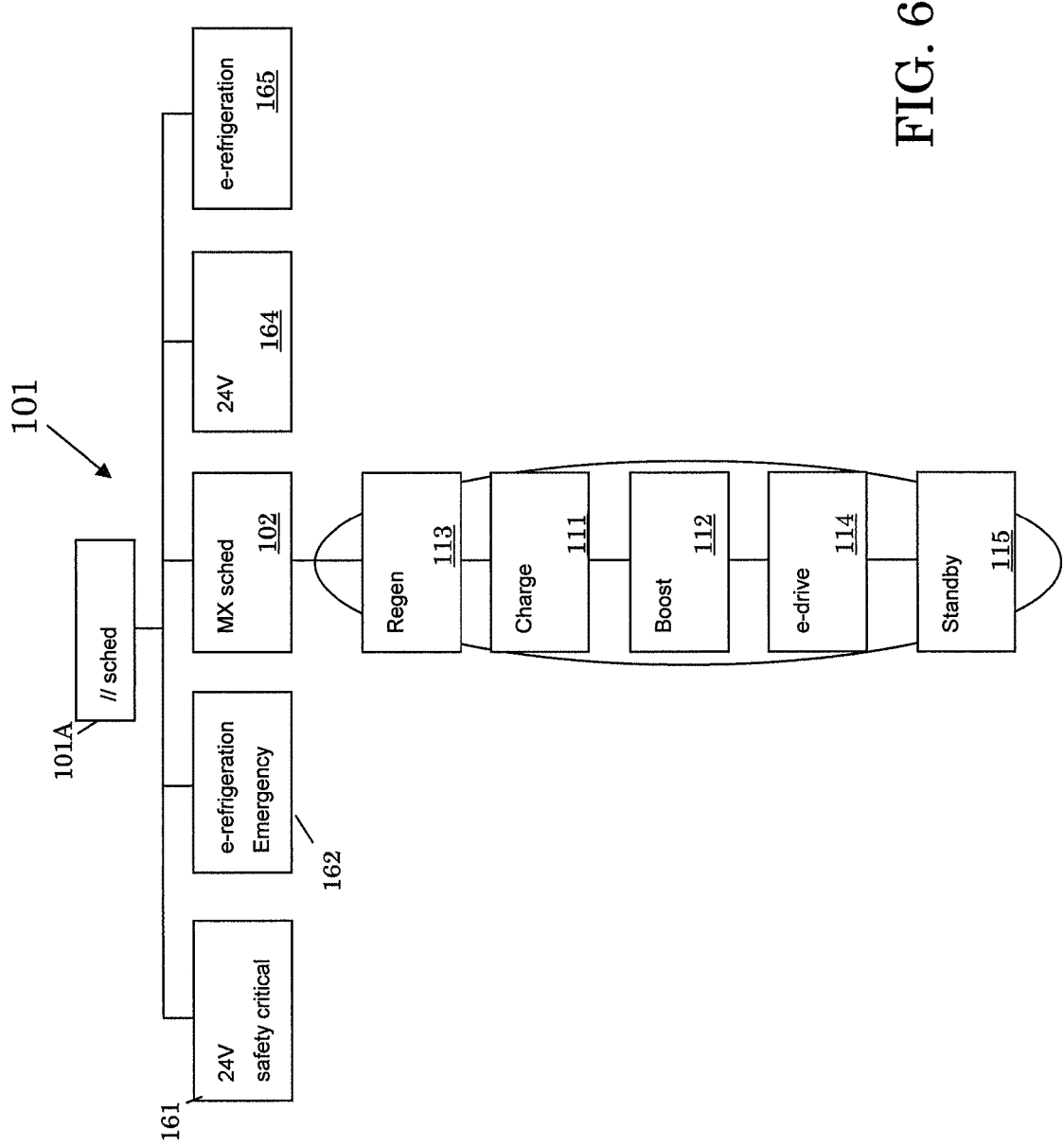
FIG. 6 is similar to FIG. 3 and shows a flow chart of a control method including controlling a refrigerating unit.

The basic layout of the FIG. 6 embodiment is the same as the FIG. 3 embodiment. For example, the controller 101 can include a mutex scheduler 102 that can allow one of the control modules to have a respective function executed in a mutually exclusive manner. As an example, the control modules can include: a regenerator module 113 having a highest priority, a Charge module 111 having a lower priority than the regenerator module 113, a Boost module 112 having a lower priority than the Charge module, an eDrive module 1134 having a lower priority than the Charge module, and, for example, a Standby module 115 for vehicle Standby mode having a lowest priority.

Also, for example, the hierarchy of the controller 101 can include a parallel scheduler 101A being located above the mutex scheduler 102, the parallel scheduler being configured to schedule various functions 161, 162, 102, 164, 165 in a parallel manner. These functions can include: a primary safety function 161 for checking/verifying primary vehicle safety conditions and/or detecting system faults, the mutex schedular function/module 102, and a secondary power module 162 for powering various secondary electric vehicle components, for example lighting. Herein, the safety function 161 has the highest priority, whereas the secondary power module 162 has a lower priority than the powertrain mutex scheduler 102. The parallel scheduler 101A can allow several of the 'subordinate' modules 161, 162, 102, 164, 165 to run at the same time, depending on the available energy, wherein available electric power is distributed from the module 161 with the highest priority towards the module 165 having lowest priority. Herein, a module will only receive power in the case that all modules having higher priorities have already been allowed all power requested thereby (for example, the secondary power module 162 can only be allowed power in the case that the primary safety module 161 and mutex scheduler 102 have been allowed their electric power budgets by the parallel scheduler 101A).

The embodiment of FIG. 6 differs from the embodiment of FIG. 3 in that the controller 101 is configured to associate at least one refrigerator priority with each refrigerator unit R, such that refrigerator priority determines whether or not, or to what extent, the refrigerator unit R is allowed to be active during operation. For example, the controller 1 can be configured to assign a regular refrigeration priority to a first refrigeration module (function) 165 relating to regular refrigerating conditions, and to assign a hybrid powertrain priority to a hybrid powertrain mutex scheduler 102, the regular refrigeration priority being lower than the hybrid powertrain priority. Besides, the controller 101 can be configured to assign an emergency refrigeration priority to a second refrigeration module (function) 162 relating to emergency refrigerating conditions, the emergency refrigeration priority being higher than the hybrid powertrain priority 102. As follows from FIG. 6, the first refrigeration module 165 and emergency refrigeration module 16 are also scheduled by the parallel scheduler 101A, the first refrigeration module 165 for example having a lowest priority (lower than the secondary power function), and the emergency refrigeration module 162 being prioritised between the safety module 161 and the powertrain mutex scheduler 102.

Thus, there is provided a combined control of the vehicle's powertrain and (for example trailer) refrigeration.

During operation of the present embodiment, under conditions that refrigeration is not needed, the hybrid control 101 can runs as described above concerning the embodiment of FIGS. 1-4 (as the refrigeration system R does not request scope).

In an embodiment, when the first-regular-refrigeration function 165 comes into scope, i.e. when the conditions in the cooling compartment require cooling, for example when a sensor has detected that the temperature in the compartment has reached an upper limit, and in the case that no hybrid functions are being used, the refrigeration function 165 can be allocated energy according to its request and availability. This will typically allow total fulfillment of the regular refrigerator function 165 as the electrical system (i.e.) including the safety functions 161 and the secondary power function 164) is generally lightly loaded under these conditions.

There are times when the regular refrigeration function 165 comes into scope, but one of the power consuming hybrid functions 112, 114 (for example Boost or eDrive) is already operating and draws power from the battery B. As the hybrid functions (i.e. their mutex scheduler 102) have a higher priority than the regular refrigeration function 165, they will preferentially receive the available power, which is restricted by the component limits on the appropriate energy paths. A remaining available electric battery power can be available for the regular refrigeration function 165, which will generally not be sufficient anymore due to the operation of the hybrid functions, and especially during a cool-down phase. The control system 101 is configured such that the regular refrigeration function 165 is allowed to utilise as much remaining electric power as available within the component limits under this condition. A similar power scheduling can apply in the case that one of the power consuming hybrid functions 112, 114 (for example Boost or eDrive) comes into scope when the regular refrigeration function 165 is already operating.

Besides, for example, there can be times when the regular refrigeration function 165 comes into scope, and one of the power generating hybrid functions (for example Charge or Regenerate) is already operating to generate electric power. In that case, for example, part of the (re)generated electric power can be available to charge the battery B, and part of the (re)generated electric power can be made available to the refrigeration system R. A similar power scheduling can apply in the case that one of the power generating functions comes into scope when the regular refrigeration function 165 is already operating.

In each case, the providing of electric power to the regular refrigeration function 165 may also be constrained by a respective electric energy budget (see also above).

During operation of the FIG. 6 embodiment, should the available electric power prove insufficient for maintaining a desired temperature level in the compartment to be refrigerated, the emergency refrigeration function 162 can be automatically enabled, as this has a higher priority than the hybrid functions (i.e. mutex scheduler 102). In this case, electric power is first routed to the refrigeration function, ensuring the reliability of this function. The remaining power is available for the hybrid functions. Therefore partial hybrid functionality is retained. In a further embodiment, for finer control, a proportional parallel scheduler may be used to provide proportional power allocation to the refrigeration and hybrid functions, depending for example on the ratio of respective requests for electric power.

Besides, according to a further embodiment, on an energy basis, the controller 101 can be configured such that the regular refrigeration function 165 may be constrained by an electric energy budget (see also above). This budget can, for example, be defined based on optimal energy availability from charge and regeneration functions (111, 113), or in a different manner. By doing so, the regular refrigeration function 165 is pre-empted when its budget is exhausted. This can maintain optimal fuel economy for the entire vehicle under real driving conditions. For example, should a content of the refrigerated compartment (for example a trailer load) threaten to spoil, the emergency refrigeration function 162 will be activated by the controller 101, as this function 162 is not restricted by the energy budget. This will lead to degradation in fuel efficiency of the vehicle, but will guarantee no loss of income due to load spoiling.

Also, according to an embodiment, further refrigeration functions may be inserted at intermediate priority levels, to balance compromise between refrigeration temperature, load and fuel efficiency.

Should the above compromise not be acceptable in a certain application for driveability, refrigeration functions may be inserted at various points in the hybrid function branch to obtain the desired compromise. An example is shown in FIG. 7.

Figure 7:
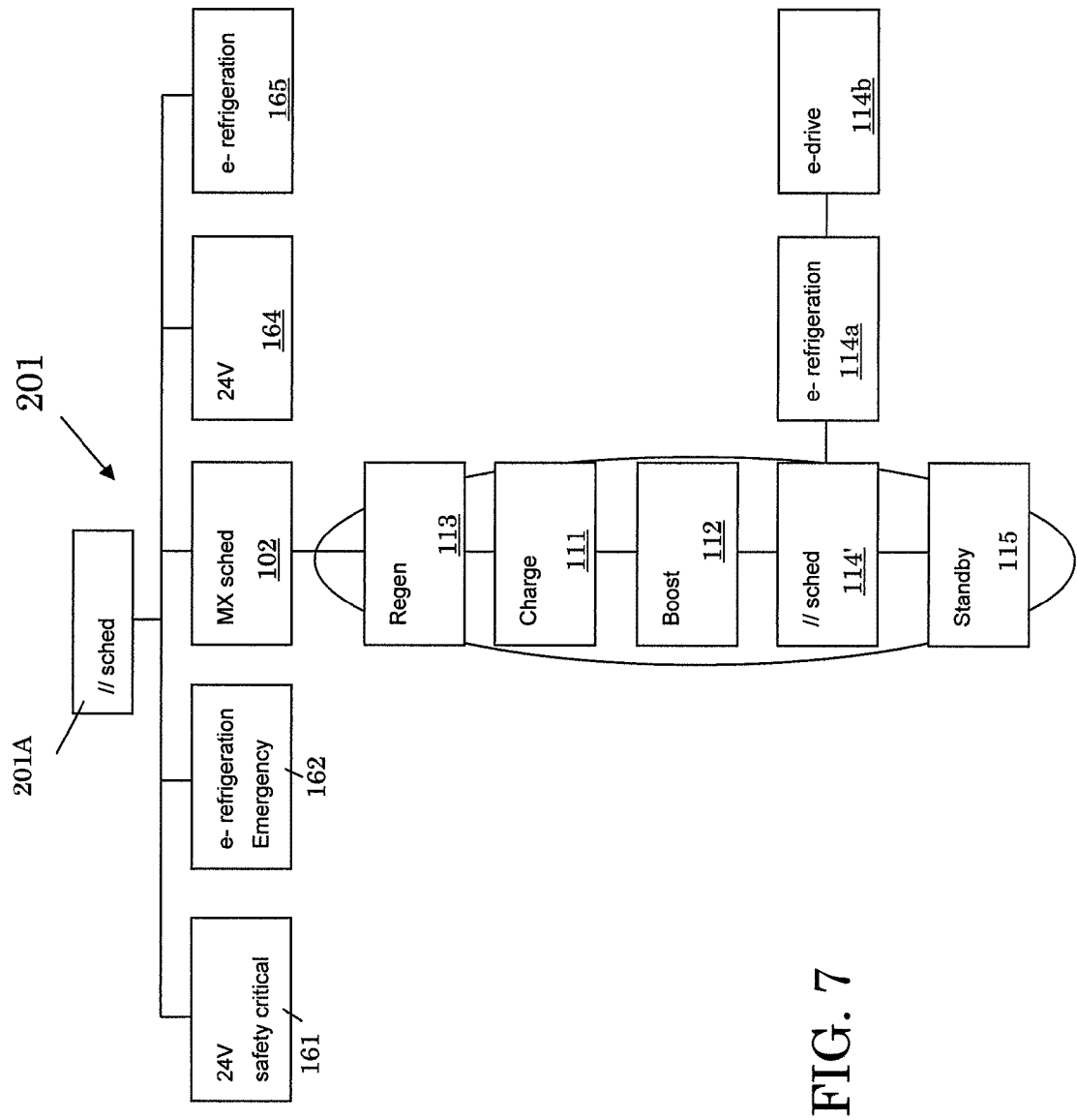
FIG. 7 is similar to FIG. 6, showing an alternative control method.

The FIG. 7 embodiment differs from the FIG. 6 embodiment in that, the mutex scheduler 102 includes a second parallel scheduler 114' configured for scheduling a second regular refrigerating function 114a and an e-drive function 114b in parallel fashion. This, this second parallel scheduler 114' and the respective chain of functions 114a, 114b replaces the e-drive module 114 of the FIG. 6 embodiment. Particularly, in the present embodiment, the second regular refrigeration module 114a gains priority over the eDrive module 114b. Thus, e-drive will only be allowed, by the second parallel scheduler 114', in the case that the regular refrigerator function 114a leaves sufficient energy to that aim, for example at very low vehicle speeds and/or in the case that the second regular refrigerator function 114a does not require (much) electric power (i.e., when the compartment does not require cooling).

Besides, according to a further embodiment, the controller can be configured such that a regular refrigeration function can also respond to certain powertrain states (torque, speed, regenerative braking), and only goes active under situations where hybrid system efficiency is relatively high. To this aim, for example, the controller 1 can be configured to detect or determine the system's efficiency.

Also, according to an embodiment, the priorities of various functions need not be static; dynamic priorities are also possible (e.g. to time delay entrance into a function, or to bump priorities).

In a further embodiment, the controller 101 can configured to estimate or determine future driving conditions that will require above-average electric power consumption in the powertrain during operation, wherein the controller 101 is configured to activate the refrigerator unit R to provide extra cooling of the compartment before those driving conditions are experienced.

For example, based on certain information available to the vehicle control system, notably adaptive/predictive information about driving condition, it is possible to provide predictive cooling to the compartment to be cooled. This may be done to ensure the temperature in the compartment limits are not exceeded when the vehicle e.g. drives for an extended period uphill, when an extended period of electric power is required for driving. The control system 101 then performs a "pre-cool" function. As a non limiting example, the control system 101 can utilize Global Positioning System (GPS) data to predict future driving conditions.

Figure 8:
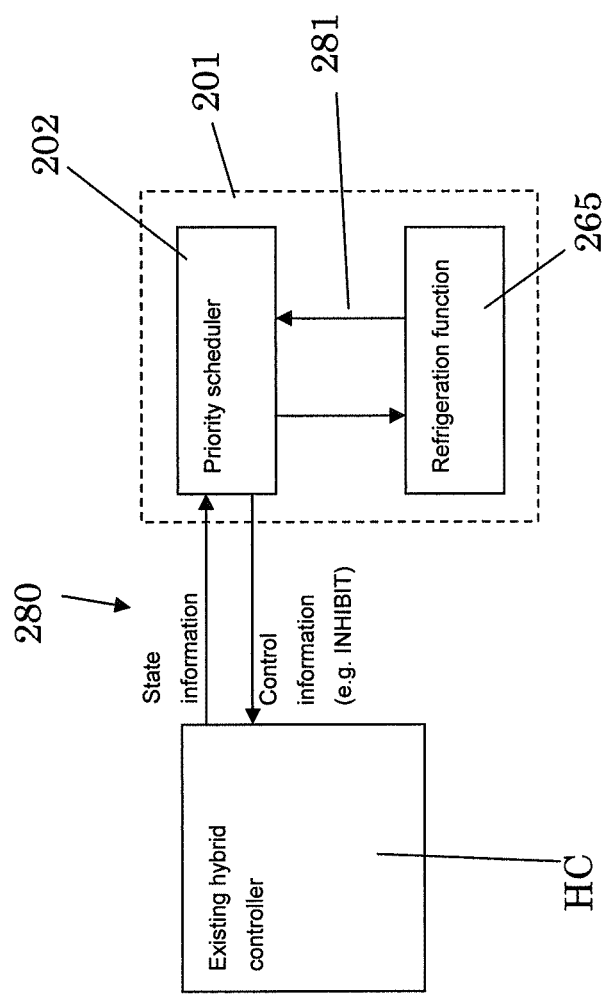
FIG. 8 schematically shows part of an alternative vehicle system.

Besides, in further embodiments, the hybrid control system need not be implemented in the same controller as the refrigeration functions and the hybrid functions need not be explicitly, or in its entirety, implemented in a priority tree. FIG. 8 schematically depicts an add-on system, wherein an existing hybrid controller (for example having a layout that differs from the controller layout shown in FIG. 3) may exchange information with an additional controller 201, the additional controller comprising a refrigeration function control module 265 and a priority scheduler 202 to provide a priority scheduler function. In this case, the priority scheduler 202 of the additional controller 201 can be master of the existing hybrid controller HC, and can be master over the refrigerating function 265. The priority scheduler 202 of the additional controller 201 can send control information to the hybrid controller and receive hybrid state information therefrom via suitable communication lines or a communication network 280. Also, internal communication 281 is available between the priority scheduler 202 and refrigeration control module(s) 265.

The present invention provides a vehicle system, wherein application of additional generator or generator sets to supply refrigeration system with electrical power (leading to high cost and increase of weight) can be avoided in a simple and efficient manner. A basic idea of the invention is to use a hybrid powertrain electrical system to supply power to a refrigeration system R (without application of an additional generator that would include an additional combustion engine). Also, in this manner, particularly by integration of a refrigeration system R into powertrain power and energy management, a total system optimisation can be achieved, leading to high energy efficiencies. Particularly, the refrigerator unit is only electrically powerable (i.e., only operates/functions on electrical power), and does, for example, not include other drive means than electric motor(s) EM. For example, the refrigerator unit compressor(s) CO (i.e. a respective electromotor EM) can receive power only from one or more of at least one electric charge accumulator B of the powertrain, at least one electric motor/generator EMG of the powertrain, and at least one electricity regenerator of the powertrain (and not from other power sources).

Moreover, in conventional vehicle systems, the powertrain and conventional refrigeration system are dimensioned based on individual need, leading to large component dimensions. Following embodiments of the present invention, there can be provided a coupling or integration of control systems and a sharing of components, so that the components need not be dimensioned to supplying full power for each individual system, as the power requests may be 'interleaved'.

For example, in conventional systems, a hybrid powertrain can deliver a maximum amount of power (for example having a battery B that can deliver up to 45 kW), the powertrain electromotor EMG can use a certain maximum first amount of power (for example 45 kW) and the separate conventional refrigerating system requires a relatively high second amount of power when in operation (for example 10 kW), which is consequently has to be delivered by a separate power generator (for example a diesel generator).

Following embodiments of the present invention (see FIGS. 5-8), the hybrid powertrain can still deliver a certain maximum amount of power (for example 45 kW), wherein the powertrain electromotor EMG can use a certain maximum first amount of power (for example 45 kW) and the conventional refrigerating system may still require a large amount of power when in operation (for example at least 10 kW). In that case, the controller 1, 101 is configured to distribute the available power in an energy efficient manner between the powertrain electromotor EMG and the refrigeration system R, depending on their needs, and for example via prioritisation and/or based on energy budgets, as has been explained above, particularly such that the maximum amount of available power will never be exceeded by an amount of power that is actually allowed or allocated (by the controller) to the various functions of the system. For example, the present invention can be implemented in an existing hybrid vehicle, without having to add extra power generation capacity to provide sufficient energy provide a desired cooling of the cooling compartent.

Although illustrative embodiments of the present invention have been described in greater detail with reference to the accompanying drawings, it is to be understood that the invention is not limited to these embodiments. Various changes or modifications may be effected by one skilled in the art without departing from the scope or spirit of the invention as defined in the claims.

It is to be understood that in the present application, the term "comprising" does not exclude other elements or steps. Also, each of the terms "a" and "an" does not exclude a plurality. Any reference sign(s) in the claims shall not be construed as limiting the scope of the claims. Also, a single controller, processor or other unit may fulfil functions of several means recited in the claims.

The invention claimed is:

1. A vehicle system for transporting refrigerated goods on roadways comprising:
   a controller;
   a powertrain configured to drive the vehicle system on roadways and to generate electric energy; and
   at least one electrically operable refrigerator unit configured to cool a storage compartment of the system, the storage compartment being located separate from a driver cabin;
   wherein the refrigerator unit is configured to be powered by electric energy generated by the powertrain,
   wherein the controller is configured to render an estimate of, or a determination of, future driving conditions that will require above-average electric power consumption in the powertrain during operation to move the vehicle, and
   wherein the controller is configured to activate, based on the estimate or determination of future driving conditions that will require above-average electric power consumption, the refrigerator unit to provide extra cooling of the compartment before the future driving conditions are experienced by the vehicle system.

2. The system according to claim 1, wherein the controller is configured to utilize Global Positioning System data to render the estimate of, or the determination of, future driving conditions.

3. The system according to claim 1, wherein the refrigerator unit is configured to consume at least 10 kW of powertrain generated energy during operation of the refrigerator unit.

4. The system according to claim 1 wherein the controller is configured to schedule vehicle functions based on priorities assigned to those functions, and to control distributing at least part of available electric power, generated by a hybrid drivetrain, to the refrigerator unit to cool the storage compartment.

5. The system according to claim 1, wherein the controller is configured to:
   assign a regular refrigeration priority to a first refrigeration function relating to regular refrigeration conditions, and
   assign a hybrid powertrain priority to a hybrid powertrain mutex scheduler,
   wherein the regular refrigeration priority is lower than the hybrid powertrain priority.

6. The system according to claim 5, wherein the controller is configured to:
   assign an emergency refrigeration priority to a second refrigeration function relating to emergency refrigerating conditions,
   wherein the emergency refrigeration priority is higher than the hybrid powertrain priority.

7. A method for distributing electric power in a hybrid vehicle system for transporting refrigerated goods on roadways, the system including a powertrain configured to both drive the hybrid vehicle system on roadways and generate electric energy, the hybrid vehicle system further including a controller and an electrically operable refrigerator unit configured to cool a storage compartment located separate from a driver cabin, the method comprising:
   powering the refrigerator unit by electric energy generated by the powertrain;
   rendering, by the controller, an estimate of, or determination of, future driving conditions that will require above-average electric power consumption in the powertrain during operation to move the hybrid vehicle; and
   activating, by the controller in response to the estimate or determination of future driving conditions, the refrigerator unit to provide extra cooling of the compartment before the future driving conditions are experienced by the hybrid vehicle system.

8. The method according to claim 7, further comprising: scheduling vehicle functions based on priorities assigned to those functions, to distribute at least part of available electric power, generated by a hybrid drivetrain, to at least one electrically operable refrigerator unit to cool at least one storage compartment.

9. The method according to claim 7, wherein the refrigerator unit is configured to consume at least 10 kW of powertrain generated energy during operation of the refrigerator unit.

10. The method according to claim 7, wherein the controller utilizes Global Positioning System data for rendering the estimate of, or the determination of, future driving conditions.

* * * * *